(12) United States Patent
Mukherjee et al.

(10) Patent No.: US 11,068,874 B2
(45) Date of Patent: Jul. 20, 2021

(54) SYSTEM, METHOD, AND COMPUTER PROGRAM PRODUCT FOR PROVIDING INSTANT CREDIT TO A CUSTOMER AT A POINT-OF-SALE

(71) Applicant: Visa International Service Association, San Francisco, CA (US)

(72) Inventors: Anindya Mukherjee, Kloten (CH); Rajib Maitra, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 179 days.

(21) Appl. No.: 16/382,622

(22) Filed: Apr. 12, 2019

(65) Prior Publication Data

US 2020/0327529 A1    Oct. 15, 2020

(51) Int. Cl.
*G06Q 20/24* (2012.01)
*G06Q 40/02* (2012.01)
*G06Q 20/20* (2012.01)

(52) U.S. Cl.
CPC .......... *G06Q 20/24* (2013.01); *G06Q 20/202* (2013.01); *G06Q 40/025* (2013.01)

(58) Field of Classification Search
CPC .... G06Q 40/025; G06Q 20/24; G06Q 20/202; G06Q 20/20; G06Q 40/02
USPC ........................................................ 705/21
See application file for complete search history.

(56) References Cited

U.S. PATENT DOCUMENTS

| | | | | |
|---|---|---|---|---|
| 7,505,938 B2* | 3/2009 | Lang | ..................... | G06Q 30/06 370/229 |
| 7,970,672 B2* | 6/2011 | Mendelovich | ......... | G06Q 30/02 705/35 |
| 8,433,648 B2* | 4/2013 | Keithley | ................ | G06Q 20/20 705/38 |
| 8,505,813 B2* | 8/2013 | Grossman | ............... | G06F 21/31 235/379 |
| 8,554,669 B2 | 10/2013 | Keithley | | |
| 8,918,338 B1* | 12/2014 | Bornhofen | ........... | G06Q 20/355 705/38 |
| 9,672,504 B2* | 6/2017 | Zito | ..................... | G06Q 20/208 |
| 9,898,780 B2* | 2/2018 | Bornhofen | ........... | G06Q 20/403 |
| 2008/0203153 A1 | 8/2008 | Keithley et al. | | |
| 2010/0306072 A1* | 12/2010 | Ford, Jr. | ............... | G06Q 20/202 705/21 |

(Continued)

*Primary Examiner* — Andrew Joseph Rudy
(74) *Attorney, Agent, or Firm* — The Webb Law Firm

(57) ABSTRACT

Described are a system, method, and computer program product for providing instant credit to a customer at a point-of-sale. The method includes receiving a transaction approval request including a full transaction amount for at least one transaction between a merchant and the customer. The method also includes communicating a credit approval request based on the transaction approval request to an issuer system. The method further includes, in response to the issuer system initially declining the credit approval request or approving less than the full transaction amount, determining, with at least one processor, customer data used to evaluate an extension of credit to the customer. The method further includes communicating the customer data to the issuer system and receiving a credit approval message from the issuer system including the full transaction amount. The method further includes communicating a transaction approval message to a merchant system including the full transaction amount.

20 Claims, 7 Drawing Sheets

(56) References Cited

U.S. PATENT DOCUMENTS

| | | | |
|---|---|---|---|
| 2011/0060641 A1* | 3/2011 | Grossman | G06Q 30/0236 |
| | | | 705/14.36 |
| 2015/0193873 A1* | 7/2015 | Hammock | G06Q 20/4016 |
| | | | 705/38 |
| 2019/0251542 A1* | 8/2019 | Sjoberg | G06Q 20/10 |
| 2019/0258818 A1* | 8/2019 | Yu | G06F 21/6245 |

* cited by examiner

SYSTEM, METHOD, AND COMPUTER PROGRAM PRODUCT FOR PROVIDING INSTANT CREDIT TO A CUSTOMER AT A POINT-OF-SALE

BACKGROUND

1. Technical Field

Disclosed embodiments or aspects relate generally to electronic payment processing networks and, in one particular embodiment or aspect, to a system, method, and computer program product for providing instant credit to a customer at a point-of-sale (POS) during the processing of a transaction.

2. Technical Considerations

A customer may use a payment device to complete a credit transaction with a merchant. Traditionally, credit transactions are a request for funds from an issuer of the payment device, with the expectation that the customer will repay the funds at a later date. Payment devices capable of credit transactions are usually assigned a credit limit, e.g., a total monthly expenditure threshold. If a customer initiates a credit transaction with a merchant and the transaction amount would cause the credit limit to be exceeded, then the issuer may decline or only partially approve the transaction. Historically, customers have limited flexibility with negotiating credit limits and have limited remedies when a credit transaction is not approved, beyond using another payment device, paying off part of a credit balance, calling an issuer for relief, or taking other inconvenient measures.

In the prior credit transaction ecosystem, merchants may lose sales and revenue, at no fault of their own, when a transaction is declined or partially approved. At the time of purchase, a customer may present a payment device to a merchant at a POS, and a merchant may receive a response if the authorization has been approved or declined. In prior systems, if the issuer declines or partially approves the transaction, the network (e.g., transaction service provider) cannot perform any machine-supported instant micro-credit (e.g., extension of credit) request for a partial or full transaction amount to any third party. For smaller amounts, prior systems cannot dynamically secure a credit to generate revenues for all parties in the ecosystem. Moreover, credit worthiness is considered only at payment device issuance, whereas subsequent payment device activity is not considered.

Therefore, there is a need in the art for a system to allow a credit transaction to continue to be processed despite receiving a credit decline or partial initial credit approval from an issuer. There is a need for an automated process by which the full amount of a credit transaction may be covered during a transaction processing flow, such that credit may be extended without significant losses in processing time or requiring additional customer interaction. Calculating micro-credit worthiness based on ongoing payment device behavior is a technical opportunity for improvement.

SUMMARY

Accordingly, and generally, provided is an improved system, method, and computer program product for providing instant credit to a customer at a point-of-sale. Preferably, provided is a system, method, and computer program product for receiving a transaction approval request for at least one transaction between a merchant and the customer at a point-of-sale. Preferably, provided is a system, method, and computer program product for communicating a credit approval request based on the transaction approval request to an issuer system. Preferably, provided is a system, method, and computer program product for, in response to the issuer system initially declining the credit approval request or approving less than a full transaction amount, determining customer data used to evaluate an extension of credit to the customer. Preferably, provided is a system, method, and computer program product for receiving a credit approval message from the issuer system for the full transaction amount. Preferably, provided is a system, method, and computer program product for communicating a transaction approval message to a merchant system associated with the point-of-sale.

According to non-limiting embodiments or aspects, provided is a computer-implemented method for providing instant credit to a customer at a point-of-sale. The method includes receiving, with at least one processor, a transaction approval request including a full transaction amount for at least one transaction between a merchant and the customer at the point-of-sale configured in an electronic payment processing network. The method also includes communicating, with at least one processor, a credit approval request based on the transaction approval request to an issuer system. The method further includes, in response to the issuer system initially declining the credit approval request or approving less than the full transaction amount, and in response to receiving a data request message from the issuer system, determining, with at least one processor, customer data used to evaluate an extension of credit to the customer. The method further includes communicating, with at least one processor, the customer data to the issuer system. The method further includes receiving, with at least one processor, a credit approval message from the issuer system including the full transaction amount. The method further includes communicating, with at least one processor, a transaction approval message to a merchant system associated with the point-of-sale, wherein the transaction approval message includes the full transaction amount.

In some non-limiting embodiments or aspects, the customer data may be determined at least partially from historic transaction data of a plurality of transactions by the customer in a preceding time period. The method may also include communicating, with at least one processor, a message to the merchant system configured to cause the point-of-sale to display a notification of partial initial credit approval. The method may further include processing, with at least one processor, settlement of the at least one transaction in response to input authorization at the point-of-sale by the customer for the extension of credit.

In some non-limiting embodiments or aspects, the method may also include communicating, with at least one processor, a message to the merchant system configured to cause the point-of-sale to display a notification of the extension of credit to the customer. The method may further include communicating, with at least one processor, a message to a mobile device of the customer notifying of the extension of credit to the customer.

In some non-limiting embodiments or aspects, the method may also include processing, with at least one processor, an ongoing plurality of transactions by the customer with at least one merchant in the electronic payment processing network. The method may further include updating, with at least one processor, a credit score of the customer based on, and in real-time with, at least one of the ongoing plurality of transactions. The customer data may include the credit score.

In some non-limiting embodiments or aspects, the determining of the customer data may be further in response to determining that a difference between the full transaction amount and a partial approval amount of the issuer system satisfies a threshold predetermined range for the extension of credit.

According to non-limiting embodiments or aspects, provided is a system for providing instant credit to a customer at a point-of-sale. The system includes at least one server computer including at least one processor. The at least one server computer is programmed and/or configured to receive a transaction approval request including a full transaction amount for at least one transaction between a merchant and the customer at the point-of-sale configured in an electronic payment processing network. The at least one server computer is also programmed and/or configured to communicate a credit approval request based on the transaction approval request to an issuer system. The at least one server computer is further programmed and/or configured to, in response to the issuer system initially declining the credit approval request or approving less than the full transaction amount, and in response to receiving a data request message from the issuer system, determine customer data used to evaluate an extension of credit to the customer. The at least one server computer is further programmed and/or configured to communicate the customer data to the issuer system. The at least one server computer is further programmed and/or configured to receive a credit approval message from the issuer system including the full transaction amount. The at least one server computer is further programmed and/or configured to communicate a transaction approval message to a merchant system associated with the point-of-sale, wherein the transaction approval message includes the full transaction amount.

In some non-limiting embodiments or aspects, the customer data may be determined at least partially from historic transaction data of a plurality of transactions by the customer in a preceding time period. The at least one server computer may be further programmed and/or configured to communicate a message to the merchant system configured to cause the point-of-sale to display a notification of partial initial credit approval. The at least one server computer may be further programmed and/or configured to process settlement of the at least one transaction in response to input authorization at the point-of-sale by the customer for the extension of credit.

In some non-limiting embodiments or aspects, the at least one server computer may be further programmed and/or configured to communicate a message to the merchant system configured to cause the point-of-sale to display a notification of the extension of credit to the customer. The at least one server computer may be further programmed and/or configured to communicate a message to a mobile device of the customer notifying of the extension of credit to the customer.

In some non-limiting embodiments or aspects, the at least one server computer may be further programmed and/or configured to process an ongoing plurality of transactions by the customer with at least one merchant in the electronic payment processing network. The at least one server computer may be further programmed and/or configured to update a credit score of the customer based on, and in real-time with, at least one of the ongoing plurality of transactions. The customer data may include the credit score.

In some non-limiting embodiments or aspects, determining the customer data may be further in response to determining that a difference between the full transaction amount and a partial approval amount of the issuer system satisfies a threshold predetermined range for the extension of credit.

According to non-limiting embodiments or aspects, provided is a computer program product for providing instant credit to a customer at a point-of-sale. the computer program product includes at least one non-transitory computer-readable medium including program instructions that, when executed by at least one processor, cause the at least one processor to receive a transaction approval request including a full transaction amount for at least one transaction between a merchant and the customer at the point-of-sale configured in an electronic payment processing network. The program instructions also cause the at least one processor to communicate a credit approval request based on the transaction approval request to an issuer system. The program instructions further cause the at least one processor to, in response to the issuer system initially declining the credit approval request or approving less than the full transaction amount, and in response to receiving a data request message from the issuer system, determine customer data used to evaluate an extension of credit to the customer. The program instructions further cause the at least one processor to communicate the customer data to the issuer system. The program instructions further cause the at least one processor to receive a credit approval message from the issuer system including the full transaction amount. The program instructions further cause the at least one processor to communicate a transaction approval message to a merchant system associated with the point-of-sale, wherein the transaction approval message includes the full transaction amount.

In some non-limiting embodiments or aspects, the customer data may be determined at least partially from historic transaction data of a plurality of transactions by the customer in a preceding time period. The program instructions may further cause the at least one processor to communicate a message to the merchant system configured to cause the point-of-sale to display a notification of partial initial credit approval. The program instructions may further cause the at least one processor to process settlement of the at least one transaction in response to input authorization at the point-of-sale by the customer for the extension of credit.

In some non-limiting embodiments or aspects, the program instructions may further cause the at least one processor to communicate a message to: (i) the merchant system configured to cause the point-of-sale to display a notification of the extension of credit to the customer; (ii) a mobile device of the customer notifying of the extension of credit to the customer; or any combination thereof.

In some non-limiting embodiments or aspects, the program instructions may further cause the at least one processor to process an ongoing plurality of transactions by the customer with at least one merchant in the electronic payment processing network. The program instructions may further cause the at least one processor to update a credit score of the customer based on, and in real-time with, at least one of the ongoing plurality of transactions. The customer data may include the credit score.

In some non-limiting embodiments or aspects, determining the customer data may be further in response to determining that a difference between the full transaction amount and a partial approval amount of the issuer system satisfies a threshold predetermined range for the extension of credit.

According to non-limiting embodiments or aspects, provided is a computer-implemented method for providing instant credit to a customer at a point-of-sale. The method includes receiving, with at least one processor, a transaction approval request including a full transaction amount for at least one transaction between a merchant and the customer at the point-of-sale configured in an electronic payment processing network. The method also includes communicating, with at least one processor, a credit approval request based on the transaction approval request to an issuer system. The method further includes, in response to receiving a message from the issuer system including an approval of less than the full transaction amount, determining, with at least one processor, customer data used to evaluate an extension of credit to the customer. The method further includes, in response to evaluating, based at least partially on the customer data, that the customer is able to be granted the extension of credit, communicating, with at least one processor, a transaction approval message to a merchant system associated with the point-of-sale, wherein the transaction approval message includes the full transaction amount.

In some non-limiting embodiments or aspects, the customer data is determined at least partially from historic transaction data of a plurality of transactions by the customer in a preceding time period.

In some non-limiting embodiments or aspects, the customer data may be determined at least partially from historic transaction data of a plurality of transactions by the customer in a preceding time period. The method may also include communicating, with at least one processor, a message to the merchant system configured to cause the point-of-sale to display a notification of partial initial credit approval. The method may further include processing, with at least one processor, settlement of the at least one transaction in response to input authorization at the point-of-sale by the customer for the extension of credit.

In some non-limiting embodiments or aspects, the method may also include communicating, with at least one processor, a message to the merchant system configured to cause the point-of-sale to display a notification of the extension of credit to the customer. The method may further include communicating, with at least one processor, a message to a mobile device of the customer notifying of the extension of credit to the customer.

In some non-limiting embodiments or aspects, the method may also include processing, with at least one processor, an ongoing plurality of transactions by the customer with at least one merchant in the electronic payment processing network. The method may further include updating, with at least one processor, a credit score of the customer based on, and in real-time with, at least one of the ongoing plurality of transactions. The customer data may include the credit score.

In some non-limiting embodiments or aspects, the determining of the customer data may be further in response to determining that a difference between the full transaction amount and a partial approval amount of the issuer system satisfies a threshold predetermined range for the extension of credit.

According to non-limiting embodiments or aspects, provided is a computer-implemented method for providing instant credit to a customer at a point-of-sale. The method includes receiving, with at least one processor, a transaction approval request including a full transaction amount for at least one transaction between a merchant and the customer at the point-of-sale configured in an electronic payment processing network. The method also includes communicating, with at least one processor, a credit approval request based on the transaction approval request to an issuer system. The method further includes, in response to receiving a message from the issuer system including an approval of less than the full transaction amount, determining, with at least one processor, customer data used to evaluate an extension of credit to the customer. The method further includes, communicating, with at least one processor, the customer data to at least one third party credit provider system. The method further includes, receiving, with at least one processor, at least one credit approval message from one or more of the at least one third party credit provider systems. The at least one credit approval message includes a credit transaction amount, wherein the credit transaction amount fulfills the full transaction amount. The method further includes communicating, with at least one processor, a transaction approval message to a merchant system associated with the point-of-sale, wherein the transaction approval message includes the full transaction amount.

In some non-limiting embodiments or aspects, the customer data may be determined at least partially from historic transaction data of a plurality of transactions by the customer in a preceding time period. The method may also include communicating, with at least one processor, a message to the merchant system configured to cause the point-of-sale to display a notification of partial initial credit approval. The method may further include processing, with at least one processor, settlement of the at least one transaction in response to input authorization at the point-of-sale by the customer for the extension of credit.

In some non-limiting embodiments or aspects, the method may also include communicating, with at least one processor, a message to the merchant system configured to cause the point-of-sale to display a notification of the extension of credit to the customer. The method may further include communicating, with at least one processor, a message to a mobile device of the customer notifying of the extension of credit to the customer.

In some non-limiting embodiments or aspects, the method may also include processing, with at least one processor, an ongoing plurality of transactions by the customer with at least one merchant in the electronic payment processing network. The method may further include updating, with at least one processor, a credit score of the customer based on, and in real-time with, at least one of the ongoing plurality of transactions. The customer data may include the credit score.

In some non-limiting embodiments or aspects, the determining of the customer data may be further in response to determining that a difference between the full transaction amount and a partial approval amount of the issuer system satisfies a threshold predetermined range for the extension of credit.

Other non-limiting embodiments or aspects of the present disclosure will be set forth in the following numbered clauses:

Clause 1: A computer-implemented method for providing instant credit to a customer at a point-of-sale, the method comprising: receiving, with at least one processor, a transaction approval request comprising a full transaction amount for at least one transaction between a merchant and the customer at the point-of-sale configured in an electronic payment processing network; communicating, with at least one processor, a credit approval request based on the transaction approval request to an issuer system; in response to the issuer system initially declining the credit approval request or approving less than the full transaction amount, and in response to receiving a data request message from the issuer system, determining, with at least one processor, customer data used to evaluate an extension of credit to the customer; communicating, with at least one processor, the customer data to the issuer system; receiving, with at least one processor, a credit approval message from the issuer system comprising the full transaction amount; and communicating, with at least one processor, a transaction approval message to a merchant system associated with the point-of-sale, wherein the transaction approval message comprises the full transaction amount.

Clause 2: The method of clause 1, wherein the customer data is determined at least partially from historic transaction data of a plurality of transactions by the customer in a preceding time period.

Clause 3: The method of clause 1 or 2, further comprising: communicating, with at least one processor, a message to the merchant system configured to cause the point-of-sale to display a notification of partial initial credit approval; and processing, with at least one processor, settlement of the at least one transaction in response to input authorization at the point-of-sale by the customer for the extension of credit.

Clause 4: The method of any of clauses 1-3, further comprising communicating, with at least one processor, a message to the merchant system configured to cause the point-of-sale to display a notification of the extension of credit to the customer.

Clause 5: The method of any of clauses 1-4, further comprising communicating, with at least one processor, a message to a mobile device of the customer notifying of the extension of credit to the customer.

Clause 6: The method of any of clauses 1-5, further comprising: processing, with at least one processor, an ongoing plurality of transactions by the customer with at least one merchant in the electronic payment processing network; and updating, with at least one processor, a credit score of the customer based on, and in real-time with, at least one of the ongoing plurality of transactions; wherein the customer data comprises the credit score.

Clause 7: The method of any of clauses 1-6, wherein the determining of the customer data is further in response to determining that a difference between the full transaction amount and a partial approval amount of the issuer system satisfies a threshold predetermined range for the extension of credit.

Clause 8: A system for providing instant credit to a customer at a point-of-sale, the system comprising at least one server computer including at least one processor, the at least one server computer programmed and/or configured to: receive a transaction approval request comprising a full transaction amount for at least one transaction between a merchant and the customer at the point-of-sale configured in an electronic payment processing network; communicate a credit approval request based on the transaction approval request to an issuer system; in response to the issuer system initially declining the credit approval request or approving less than the full transaction amount, and in response to receiving a data request message from the issuer system, determine customer data used to evaluate an extension of credit to the customer; communicate the customer data to the issuer system; receive a credit approval message from the issuer system comprising the full transaction amount; and communicate a transaction approval message to a merchant system associated with the point-of-sale, wherein the transaction approval message comprises the full transaction amount.

Clause 9: The system of clause 8, wherein the customer data is determined at least partially from historic transaction data of a plurality of transactions by the customer in a preceding time period.

Clause 10: The system of clause 8 or 9, wherein the at least one server computer is further programmed and/or configured to: communicate a message to the merchant system configured to cause the point-of-sale to display a notification of partial initial credit approval; and process settlement of the at least one transaction in response to input authorization at the point-of-sale by the customer for the extension of credit.

Clause 11: The system of any of clauses 8-10, wherein the at least one server computer is further programmed and/or configured to communicate a message to the merchant system configured to cause the point-of-sale to display a notification of the extension of credit to the customer.

Clause 12: The system of any of clauses 8-11, wherein the at least one server computer is further programmed and/or configured to communicate a message to a mobile device of the customer notifying of the extension of credit to the customer.

Clause 13: The system of any of clauses 8-12, wherein the at least one server computer is further programmed and/or configured to: process an ongoing plurality of transactions by the customer with at least one merchant in the electronic payment processing network; and update a credit score of the customer based on, and in real-time with, at least one of the ongoing plurality of transactions; wherein the customer data comprises the credit score.

Clause 14: The system of any of clauses 8-13, wherein determining the customer data is further in response to determining that a difference between the full transaction amount and a partial approval amount of the issuer system satisfies a threshold predetermined range for the extension of credit.

Clause 15: A computer program product for providing instant credit to a customer at a point-of-sale, the computer program product comprising at least one non-transitory computer-readable medium including program instructions that, when executed by at least one processor, cause the at least one processor to: receive a transaction approval request comprising a full transaction amount for at least one transaction between a merchant and the customer at the point-of-sale configured in an electronic payment processing network; communicate a credit approval request based on the transaction approval request to an issuer system; in response to the issuer system initially declining the credit approval request or approving less than the full transaction amount, and in response to receiving a data request message from the issuer system, determine customer data used to evaluate an extension of credit to the customer; communicate the customer data to the issuer system; receive a credit approval message from the issuer system comprising the full transaction amount; and communicate a transaction approval message to a merchant system associated with the point-of-sale, wherein the transaction approval message comprises the full transaction amount.

Clause 16: The computer program product of clause 15, wherein the customer data is determined at least partially from historic transaction data of a plurality of transactions by the customer in a preceding time period.

Clause 17: The computer program product of clause 15 or 16, wherein the program instructions further cause the at least one processor to: communicate a message to the merchant system configured to cause the point-of-sale to display a notification of partial initial credit approval; and process settlement of the at least one transaction in response to input authorization at the point-of-sale by the customer for the extension of credit.

Clause 18: The computer program product of any of clauses 15-17, wherein the program instructions may further cause the at least one processor to communicate a message to: (i) the merchant system configured to cause the point-of-sale to display a notification of the extension of credit to the customer; (ii) a mobile device of the customer notifying of the extension of credit to the customer; or any combination thereof.

Clause 19: The computer program product of any of clauses 15-18, wherein the program instructions further cause the at least one processor to: process an ongoing plurality of transactions by the customer with at least one merchant in the electronic payment processing network; and update a credit score of the customer based on, and in real-time with, at least one of the ongoing plurality of transactions; wherein the customer data comprises the credit score.

Clause 20: The computer program product of any of clauses 15-19, wherein determining the customer data is further in response to determining that a difference between the full transaction amount and a partial approval amount of the issuer system satisfies a threshold predetermined range for the extension of credit.

Clause 21: A computer-implemented method for providing instant credit to a customer at a point-of-sale, the method comprising: receiving, with at least one processor, a transaction approval request comprising a full transaction amount for at least one transaction between a merchant and the customer at the point-of-sale configured in an electronic payment processing network; communicating, with at least one processor, a credit approval request based on the transaction approval request to an issuer system; in response to receiving a message from the issuer system comprising a decline or an approval of less than the full transaction amount, determining, with at least one processor, customer data used to evaluate an extension of credit to the customer; in response to evaluating, based at least partially on the customer data, that the customer is able to be granted the extension of credit; and communicating, with at least one processor, a transaction approval message to a merchant system associated with the point-of-sale, wherein the transaction approval message comprises the full transaction amount.

Clause 22: The method of clause 21, wherein the customer data is determined at least partially from historic transaction data of a plurality of transactions by the customer in a preceding time period.

Clause 23: The method of clause 21 or 22, further comprising: communicating, with at least one processor, a message to the merchant system configured to cause the point-of-sale to display a notification of partial initial credit approval; and processing, with at least one processor, settlement of the at least one transaction in response to input authorization at the point-of-sale by the customer for the extension of credit.

Clause 24: The method of any of clauses 21-23, further comprising communicating, with at least one processor, a message to the merchant system configured to cause the point-of-sale to display a notification of the extension of credit to the customer.

Clause 25: The method of any of clauses 21-24, further comprising communicating, with at least one processor, a message to a mobile device of the customer notifying of the extension of credit to the customer.

Clause 26: The method of any of clauses 21-25, further comprising: processing, with at least one processor, an ongoing plurality of transactions by the customer with at least one merchant in the electronic payment processing network; and updating, with at least one processor, a credit score of the customer based on, and in real-time with, at least one of the ongoing plurality of transactions; wherein the customer data comprises the credit score.

Clause 27: The method of any of clauses 21-26, wherein the determining of the customer data is further in response to determining that a difference between the full transaction amount and a partial approval amount of the issuer system satisfies a threshold predetermined range for the extension of credit.

Clause 28: A computer-implemented method for providing instant credit to a customer at a point-of-sale, the method comprising: receiving, with at least one processor, a transaction approval request comprising a full transaction amount for at least one transaction between a merchant and the customer at the point-of-sale configured in an electronic payment processing network; communicating, with at least one processor, a credit approval request based on the transaction approval request to an issuer system; in response to receiving a message from the issuer system including a decline or an approval of less than the full transaction amount, determining, with at least one processor, customer data used to evaluate an extension of credit to the customer; communicating, with at least one processor, the customer data to at least one third party credit provider system; receiving, with at least one processor, at least one credit approval message from one or more of the at least one third party credit provider systems, the at least one credit approval message comprising a credit transaction amount, wherein the credit transaction amount fulfills the full transaction amount; and communicating, with at least one processor, a transaction approval message to a merchant system associated with the point-of-sale, wherein the transaction approval message comprises the full transaction amount.

Clause 29: The method of clause 28, wherein the customer data is determined at least partially from historic transaction data of a plurality of transactions by the customer in a preceding time period.

Clause 30: The method of clause 28 or 29, further comprising: communicating, with at least one processor, a message to the merchant system configured to cause the point-of-sale to display a notification of partial initial credit approval; and processing, with at least one processor, settlement of the at least one transaction in response to input authorization at the point-of-sale by the customer for the extension of credit.

Clause 31: The method of any of clauses 28-30, further comprising communicating, with at least one processor, a message to the merchant system configured to cause the point-of-sale to display a notification of the extension of credit to the customer.

Clause 32: The method of any of clauses 28-31, further comprising communicating, with at least one processor, a message to a mobile device of the customer notifying of the extension of credit to the customer.

Clause 33: The method of any of clauses 28-32, further comprising: processing, with at least one processor, an ongoing plurality of transactions by the customer with at least one merchant in the electronic payment processing network; and updating, with at least one processor, a credit score of the customer based on, and in real-time with, at least one of the ongoing plurality of transactions; wherein the customer data comprises the credit score.

Clause 34: The method of any of clauses 28-33, wherein the determining of the customer data is further in response to determining that a difference between the full transaction amount and a partial approval amount of the issuer system satisfies a threshold predetermined range for the extension of credit.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
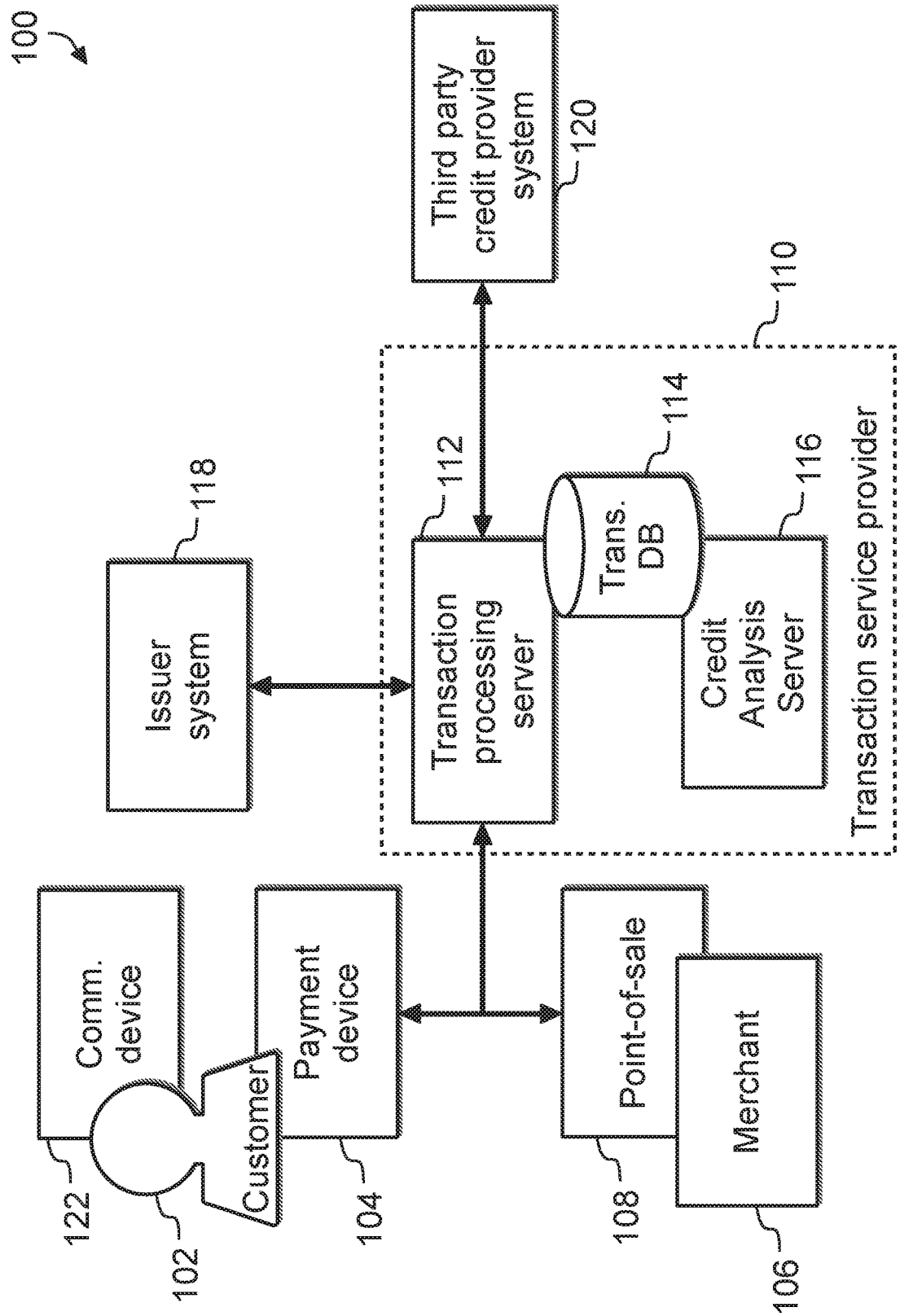
FIG. 1 is a schematic diagram of one embodiment or aspect of a system for providing instant credit to a customer at a point-of-sale.

For purposes of the description hereinafter, the terms "upper", "lower", "right", "left", "vertical", "horizontal", "top", "bottom", "lateral", "longitudinal," and derivatives thereof shall relate to non-limiting embodiments as they are oriented in the drawing figures. However, it is to be understood that non-limiting embodiments may assume various alternative variations and step sequences, except where expressly specified to the contrary. It is also to be understood that the specific devices and processes illustrated in the attached drawings, and described in the following specification, are simply exemplary embodiments. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM), Code Division Multiple Access (CDMA), Long-Term Evolution (LTE), Worldwide Interoperability for Microwave Access (WiMAX), etc.), and/or the like. It will be appreciated that numerous other arrangements are possible.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "payment device" may refer to a portable financial device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications, a token service executing one or more software applications, and/or the like. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical payment instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "acquirer institution" may refer to an entity licensed and/or approved by the transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a bank. As used herein, the term "acquirer system" may refer to one or more computer systems, computer devices, software applications, and/or the like operated by or on behalf of an acquirer institution.

As used herein, the terms "authenticating system" and "authentication system" may refer to one or more computing devices that authenticate a user and/or an account, such as but not limited to a transaction processing system, merchant system, issuer system, payment gateway, a third-party authenticating service, and/or the like.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "server" or "server computer" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a merchant's POS system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to a system, method, and computer program product for providing instant credit to a customer at a point-of-sale (POS). Described embodiments and aspects improve upon prior art technical solutions by leveraging the in-data-stream position of a transaction processing server to resolve credit decline messages or partial approval messages. Extensions of credit can be analyzed in real-time with the processing of a customer transaction at a POS, greatly improving the speed and efficiency of computerized settlement processes. Transaction settlement is further streamlined by not requiring additional customer inputs, separate transaction requests, or personnel management. The number of communicative network connections is reduced, as credit provider systems no longer need to generate communications back and forth with customer/merchant communication devices for full credit authorizations. Furthermore, described systems and methods combine the benefits of an ongoing customer credit risk assessment system with real-time transaction processing systems, thereby reducing calculation/analysis time at the moment of credit extension. Furthermore, prior art systems lack the interoperability of the described systems and methods, which integrate third party credit provider networks, issuer systems, acquirer systems, transaction service provider systems, merchant systems, and/or customer systems.

With specific reference to FIG. 1, and in some non-limiting embodiments or aspects, provided is a system 100 for providing instant credit to a customer 102 at a point-of-sale (POS) 108. The system 100 includes a customer 102 that engages in one or more transactions with a POS 108 of a merchant 106 using one or more payment devices 104. The transactions are communicated to a transaction processing server 112 of a transaction service provider 110, e.g., in the form of transaction authorization requests. The transaction processing server 112 may be a plurality of servers of the transaction service provider 110. Transaction data of the transaction may be stored in a transaction database 114 by the transaction processing server 112 before, during, and/or after processing of the transaction. Transaction data may include, but is not limited to, payment device identifier, payment device type, merchant identifier, merchant type, transaction amount, transaction time, transaction date, transaction description, and/or the like.

For transactions that are credit transactions, the transaction processing server 112 may communicate a credit approval request, based on the transaction authorization request, to an issuer system 118 associated with the customer's 102 payment device 104. The credit approval request may include, but is not limited to, a transaction identifier, a credit amount, a payment device identifier, and/or the like. The credit approval request may include and/or be the transaction authorization request. If a credit transaction is for an amount less than or equal to a credit limit of the payment device 104 (e.g., an hourly limit, a daily limit, a monthly limit, etc.), the issuer system 118 may communicate a credit approval message to the transaction processing server 112. Comparison of the credit transaction to the credit limit may be on the basis of the credit transaction alone, e.g., determining if the credit transaction amount meets or exceeds an individual transaction threshold; and/or on the basis of an aggregate transaction amount, e.g., determining if the credit transaction amount, in combination with past transactions in a time period for the payment device 104, meets or exceeds an aggregate transaction threshold. The transaction processing server 112 may, if having received a credit approval message, complete the processing of the credit transaction and communicate a transaction approval message, e.g., in the form of a transaction authorization response message, to the POS 108.

If the credit transaction is for an amount more than a credit limit of the payment device 104, or the issuer system 118 otherwise does not approve the full amount of the credit transaction, the issuer system 118 may communicate a credit decline message or partial credit approval message to the transaction processing server 112. The credit decline message may also include a partial credit approval for an amount less than the full transaction amount. Instead of cancelling/declining the transaction, the transaction processing server 112 may initiate, during the processing of the transaction, a process to determine if the customer 102 may be granted an extension of credit to satisfy the full transaction amount. The transaction processing server 112 and/or a credit analysis server 116 may determine customer data used to evaluate an extension of credit. Customer data may include, but is not limited to, a creditworthiness recommendation, personal information of the customer 102, historic transaction data of the customer 102 and/or payment device 104, probability of customer payback, data of other customers/payment devices, and/or the like. Customer data may also include, but is not limited to, customer 102 identifier(s), payment device 104 identifier(s), payment device 104 type(s) (e.g., debit, credit, pre-paid, etc.), transaction amount(s), average transaction amount in a time period, maximum transaction amount in a time period, minimum transaction amount in a time period, daily spending total(s) of the customer 102 and/or payment device 104, monthly spending total(s) by the customer 102 and/or payment device 104, independent risk assessment data (e.g., data of frauds associated with the payment device, risk level scores, etc.), approval ratio (e.g., number of transactions approved vs. number of transactions declined), transaction channels, means of authentication/verification for the payment device, time of payment device circulation since issue, and/or the like.

With further reference to FIG. 1, and in some non-limiting embodiments or aspects, the transaction processing server 112 may communicate the customer data to the issuer system 118 for the issuer to determine if the customer 102 may be granted an extension of credit for the remainder of the full transaction amount (e.g., all or part of the full transaction amount). The transaction processing server 112 may communicate the customer data to the issuer system 118 in response to a request by the issuer system 118 for the customer data. A request from the issuer system 118 for customer data may specify types of customer data for the transaction processing server 112 to communicate. The issuer system 118, having received the customer data, may then evaluate if the customer 102 meets creditworthiness parameters for an extension of credit for a remainder of the full transaction amount. In some non-limiting embodiments or aspects, the credit analysis server 116 of the transaction service provider 110 may evaluate if the customer 102 meets creditworthiness parameters for an extension of credit, in which case the customer data communicated to the issuer system 118 may include a creditworthiness recommendation, e.g., an indication that the extension of credit should be granted, an indication that the extension of credit should be declined, and/or the like. The credit analysis server 116 may be configured to apply creditworthiness evaluation parameters specific to the issuer system 118, and such parameters may be input by the issuer system 118 via an interface with the credit analysis server 116. Creditworthiness evaluation parameters may include statistical aggregated values of past transaction amounts, dates, times, locations, merchants, locations, and/or the like, compared to target transaction parameters. If the customer data satisfies the creditworthiness parameters associated with the issuer, the issuer system 118 may communicate a credit approval message for the full transaction amount to the transaction processing server 112 (e.g., as one credit approval or as two or more credit approvals). The transaction processing server 112 may then communicate a transaction approval message for the credit transaction to the POS 108 of the merchant 106.

With further reference to FIG. 1, and in some non-limiting embodiments or aspects, the transaction processing server 112 may internally evaluate the customer data to determine if the customer 102 may be granted an extension of credit by the transaction service provider 110 for the remainder of the full transaction amount. The transaction processing server 112 may evaluate the customer data in response to the issuer system 118 initially declining the credit approval request and/or approving less than the full transaction amount. The transaction service provider 110, via a credit analysis server 116, may evaluate if the customer 102 meets creditworthiness parameters for an extension of credit for a remainder of the full transaction amount. If the customer data satisfies the creditworthiness parameters of the transaction service provider 110, the transaction processing server 112 may authorize an extension of credit for the remainder of the full transaction amount and communicate a transaction approval message to the POS 108 of the merchant 106.

With further reference to FIG. 1, and in some non-limiting embodiments or aspects, the transaction processing server 112 may communicate the customer data to a third party credit provider system 120 for the third party credit provider to determine if the customer 102 may be granted an extension of credit for the remainder of the full transaction amount. The transaction processing server 112 may communicate the customer data to the third party credit provider system 120 in response to the issuer system 118 initially declining the credit approval request or approving less than the full transaction amount. The third party credit provider system 120, having received the customer data, may then evaluate if the customer 102 meets creditworthiness parameters for an extension of credit for a remainder of the full transaction amount. In some non-limiting embodiments or aspects, the credit analysis server 116 of the transaction service provider 110 may evaluate if the customer 102 meets creditworthiness parameters for an extension of credit, in which case the customer data communicated to the third party credit provider system 120 may include a creditworthiness recommendation, e.g., an indication that the extension of credit should be granted, an indication that the extension of credit should be declined, and/or the like. The credit analysis server 116 may be configured to apply creditworthiness evaluation parameters specific to the third party credit provider system 120, and such parameters may be input by the third party credit provider via an interface with the credit analysis server 116. If the customer data satisfies the creditworthiness parameters associated with the third party credit provider, the third party credit provider system 120 may communicate a credit approval message for an extension of credit to the transaction processing server 112 to cover the remainder of the full transaction amount. The transaction processing server 112 may then communicate a transaction approval message for the credit transaction to the POS 108 of the merchant 106.

Notifications of extensions of credit, granted by issuer systems 118, transaction service providers 110, third party credit provider systems 120, and/or the like, may be communicated to a customer's 102 communication device 122. The transaction processing server 112, or a communication server associated therewith, may generate and communicate a message to a communication device 122 of the customer 102, e.g., a mobile device, with information about the extension of credit, including, but not limited to, extension credit amount, extension credit provider, extension credit payback information, and/or the like. It will be appreciated that the transaction processing server 112, discussed throughout, may be the same server as the credit analysis server 116. It will further be appreciated that the third party credit provider system 120 may be associated with a merchant 106.

With further reference to FIG. 1, and in some non-limiting embodiments or aspects, a customer 102 may be first required to subscribe to a credit extension service to be considered for micro-credits as described herein. A transaction processing server 112 may first determine if the customer 102 is a subscriber before determining customer data used to evaluate an extension of credit. Furthermore, the transaction service provider 110 system may communicate a confirmation message to a communication device 122 of the customer 102 before the extension of credit is issued.

Figure 2:
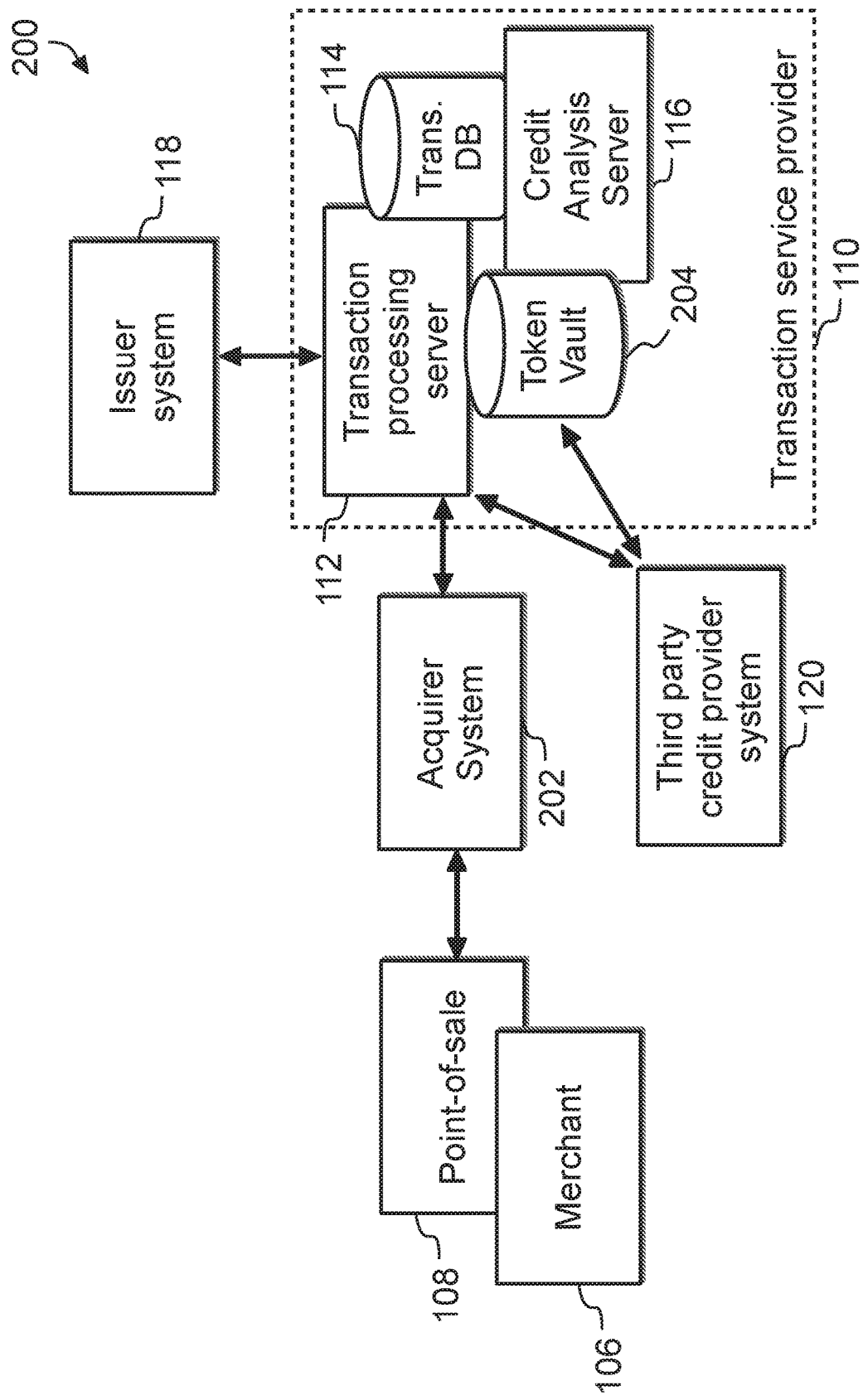
FIG. 2 is a schematic diagram of one embodiment or aspect of a system for providing instant credit to a customer at a point-of-sale.

With specific reference to FIG. 2, and in non-limiting embodiments or aspects, provided is a system 200 for providing instant credit to a customer 102 at a point-of-sale (POS) 108. A transaction may be initiated at the POS 108 of a merchant 106, and an acquirer system 202 may construct an authorization request and forward it to a transaction service provider 110. The authorization request may be received by a transaction processing server 112. The transaction processing server 112 may then communicate a credit approval request to an issuer system 118 associated with a payment device of the initiated transaction. The credit approval request may be, or include, the transaction authorization request. If the issuer system 118 determines that the full transaction amount cannot be credited for the transaction, the issuer system 118 may communicate to the transaction processing server 112 a decline and/or a partial credit approval for an amount less than the full transaction amount. The transaction processing server 112 may then determine if the remainder (e.g., the amount less than the full transaction amount that the issuer system 118 will not credit) is within a predetermined threshold, e.g., $500. The predetermined threshold may be an amount up to which the customer is able to be granted as an extension of credit (e.g., a micro-credit range). If the amount declined is not within the threshold, the transaction processing server 112 may communicate the decline to the POS 108. If the amount declined is within the threshold, the transaction processing server 112 may then determine customer data indicative of customer credit worthiness that may be used to evaluate an extension of credit (e.g., to determine if a customer should be given a micro-credit).

The transaction processing server 112 may communicate a request for an extension of credit, e.g., a micro-credit request, to a third party credit provider system 120. The request for an extension of credit may include a customer identifier (e.g., a customer token), a new stripped authorization request message, a card-not-present (CNP) indicator (e.g., to indicate whether a payment device is physically present at a POS 108), a maximum micro-credit amount, and the customer data (e.g., including a probability of the customer paying back the extension of credit). The stripped authorization request message may be the original authorization request message that is stripped by the transaction processing server 112 and used to construct the new micro-credit request message. The third party credit provider system 120 may be communicatively connected to a token vault 204, e.g., a token database, and may use a customer token to retrieve customer data. Customer data may be stored in the token database by the transaction service provider 110. Using the customer data retrieved from the token vault 204, the third party credit provider system 120 may determine a credit rating, receive a credit rating from a regional agency, and/or use the customer data to determine credit worthiness with regard to the extension of credit. A third party credit provider need not issue its own payment devices or personal account numbers, but it may settle transactions with Visa and the customer to cover an extension of credit. Further, a third party credit provider may be able to tolerate higher risk levels than the issuer of the customer's payment device.

It may be necessary to prevent third party credit provider systems 120 from accessing payment device identifiers of underlying transactions for which micro-credits are issued. In particular, no other entity beside the issuer of the payment device may know the payment device identifier. The transaction service provider 110 may generate new tokens only for micro-credit (e.g., extension of credit) transactions. New tokens may be stored in a token vault 204. A token may be restricted from being used for other financial transactions other than micro-credit transactions. Tokens may include a new indicator (e.g., a code) to specially designate messages as pertaining to a micro-credit, e.g., a credit extension, particularly for advice messages transmitted to a POS 108.

If the third party credit provider system 120 determines that the customer will be granted an extension of credit to complete the transaction, by covering all or part of the full transaction amount, the third party credit provider system 120 may communicate a credit approval message to the transaction processing server 112. If the third party credit provider system 120 determines that the customer will not be granted an extension of credit, the third party credit provider system 120 may communicate a credit decline message and/or partial approval message to the transaction processing server 112, and the transaction processing server 112 may attempt to acquire the extension of credit through another entity (e.g., the transaction service provider 110, issuer system 118, another third party credit provider, etc.) or otherwise communicate a transaction decline to the POS 108. If an extension of credit is approved by the third party credit provider system 120, the transaction processing server 112 may complete settlement of the transaction by communicating with the issuer system 118 and/or third party credit provider system 120 for any applicable credit issuance, and the transaction processing server 112 may communicate a transaction approval message, e.g., a transaction authorization message, to the merchant 106 system (e.g., the POS 108). The transaction service provider 110 may record the transaction in the transaction database 114 as a special transaction to denote that the credit transaction was approved via an extension of credit, at least in part. The special transaction status may be an indicator (e.g., code) designating the transaction as pertaining to a micro-credit, and/or requiring multiple settlements with multiple parties.

With further reference to FIG. 2, and in some non-limiting embodiments or aspects, when an initial credit approval request is declined or partially approved by an issuer, then the transaction processing server 112 may generate a micro-credit message, e.g., a transaction authorization request sequence of data, to receive credit approval for an extension of credit that is equal to or less than the full transaction amount. The micro-credit message may be communicated to the issuer system 118 and/or one or more third party credit provider systems 120 for processing and approval. The new micro-credit message may include a new token ID to replace the original payment device identifier, the token ID representing a micro-credit request token stored in the token vault 204. Micro-credit request tokens may be associated with customer data such as, but not limited to, customer name, date of birth, passport or social security number, billing address, and/or the like. The new micro-credit message may also include a customer billing amount, representing the micro-credit amount required to satisfy the remainder of the full transaction amount (e.g., all or part of the full transaction amount). The new micro-credit message may further have an associated card sequence number set to zero, and integrated card chip (ICC) related data may be emptied out. Transaction fee data, product ID data, and fee program indicator data may all be defined with new labels for the micro-credit message. The micro-credit message may also include a risk score (e.g., a credit score), based on historic information for the customer, may include a new field with a maximum amount for which the customer may be given the micro-credit, and a new field representing the probability of the customer paying the micro-credit back. It will be appreciated that many configurations of the micro-credit message are possible.

Figure 3:
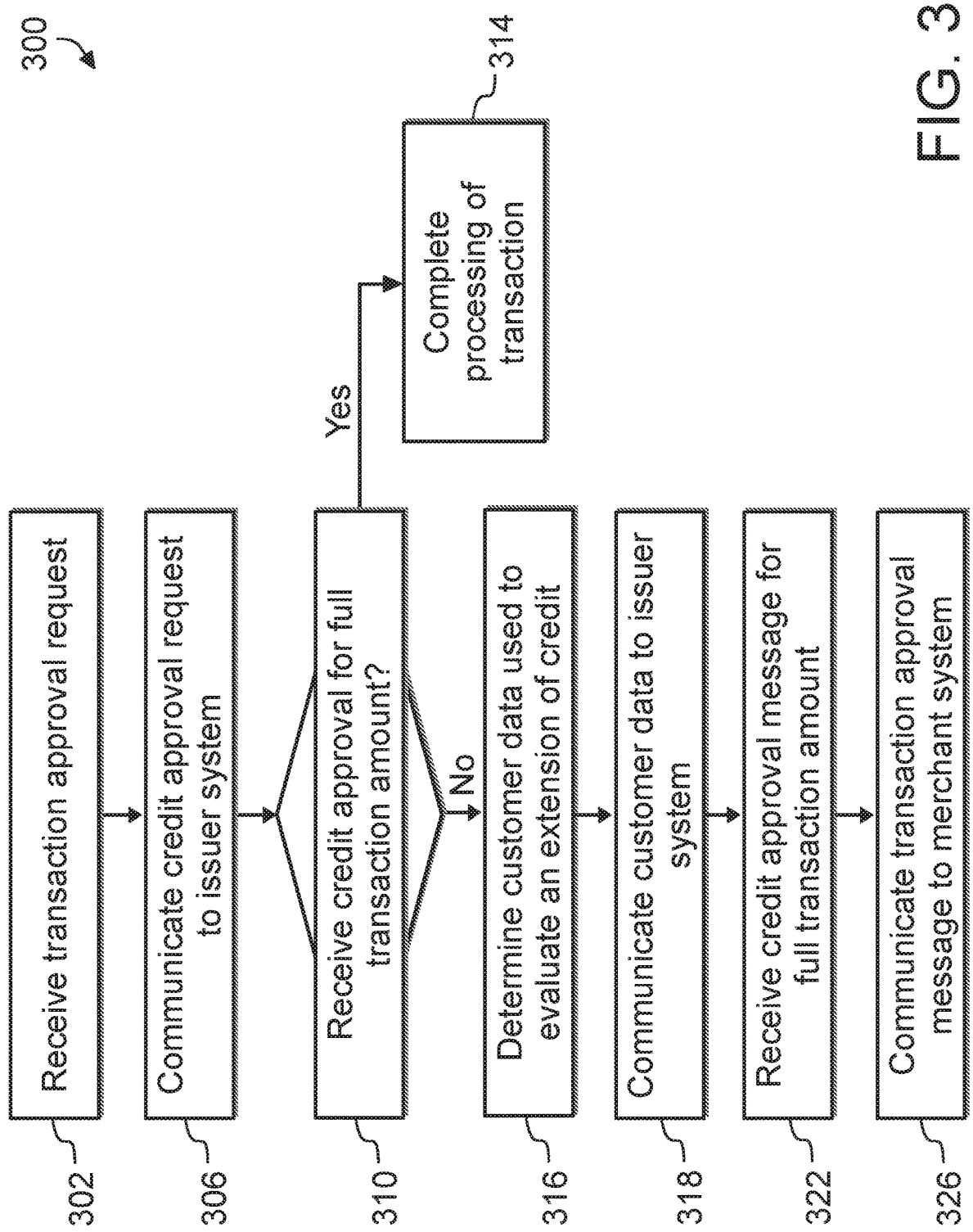
FIG. 3 is a process diagram of one embodiment or aspect of a system for providing instant credit to a customer at a point-of-sale.

With specific reference to FIG. 3, and in non-limiting embodiments or aspects, provided is a method 300 of providing instant credit to a customer at a point-of-sale (POS). The steps of the method 300 may be completed by a transaction processing server, a credit analysis server, another transaction service provider system server, or any combination thereof. In step 302, the transaction processing server may receive a transaction approval request, e.g., a transaction authorization request. The transaction approval request may include a full transaction amount for one or more transactions between a merchant and a customer at a POS configured in an electronic payment processing network. In step 306, the transaction processing server may communicate a credit approval request based on the transaction approval request to an issuer system. The credit approval request may be the transaction approval request. The credit approval request may include part or all of the data of the transaction approval request. In step 310, the transaction processing server may or may not receive a credit approval from the issuer system for the full transaction amount of the transaction. If the transaction processing server receives a credit approval message authorizing a credit transaction for the full transaction amount, then the transaction processing server may complete processing of the transaction in step 314.

If the issuer system does not approve the full transaction amount, either through a credit decline or a partial credit approval, the transaction processing server may determine customer data used to evaluate an extension of credit to the customer in step 316. In step 318, the transaction processing server may communicate the customer data to the issuer system, so as to cause the issuer system to evaluate if the customer should be given an extension of credit, e.g., a micro-credit, to cover the remainder of the full transaction amount. In step 322, the transaction processing server may receive a credit approval message for the full transaction amount. Credit approval of the full transaction amount may be a single approval covering the full transaction amount. Credit approval of the full transaction amount may also be more than one partial approval covering the full transaction amount. In step 326, the transaction processing server may communicate a transaction approval message, e.g., a transaction authorization message, to a merchant system associated with the POS (e.g., including to the POS itself), wherein the transaction approval message includes the full transaction amount. It will further be appreciated that the issuer system may continue not to provide credit approval for the full transaction amount, even when communicated the customer data. In such a case, other entities may be communicated customer data for the issuance of an extension of credit. The transaction processing server may also finally decline the credit transaction.

Figure 4:
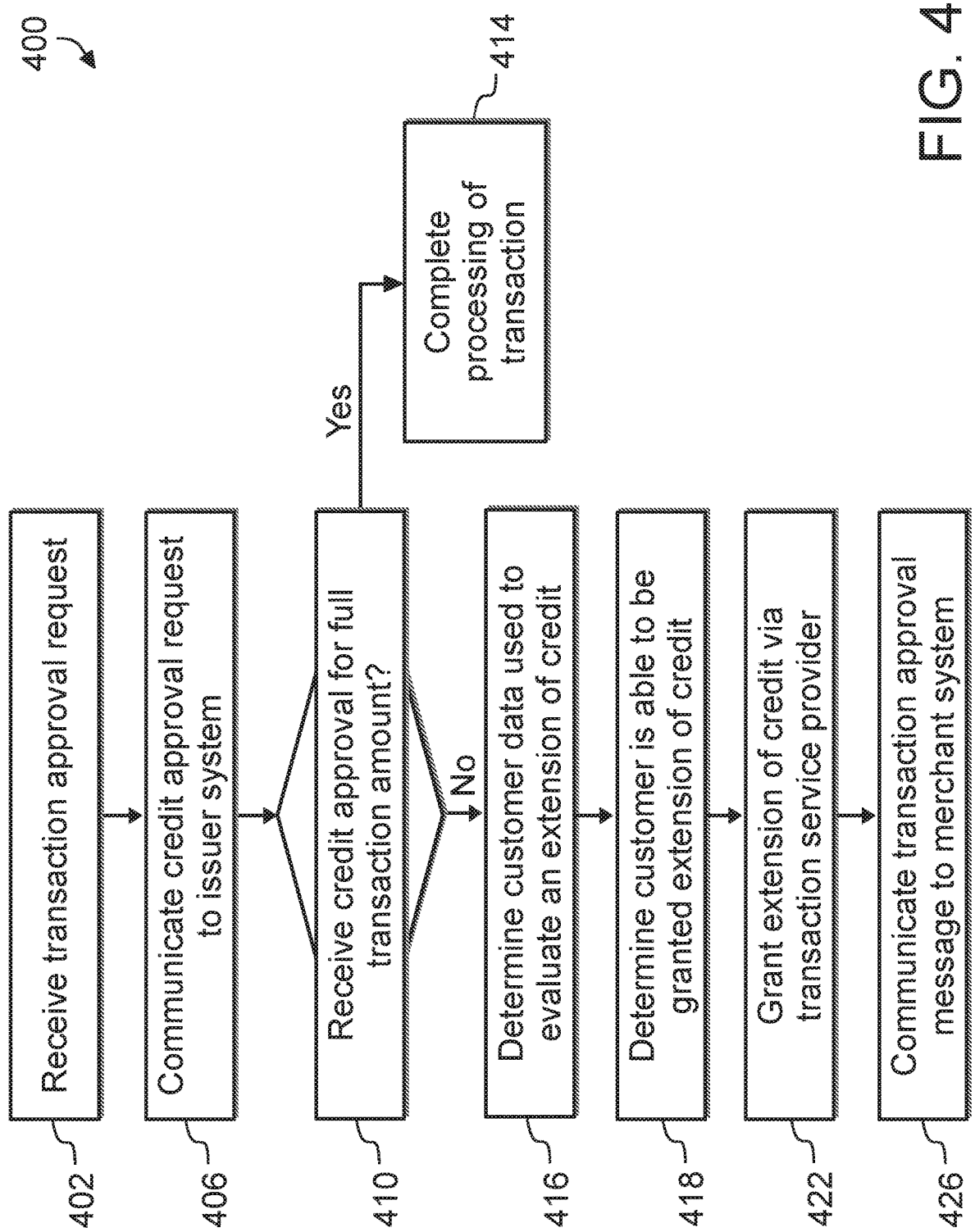
FIG. 4 is a process diagram of one embodiment or aspect of a system for providing instant credit to a customer at a point-of-sale.

With specific reference to FIG. 4, and in non-limiting embodiments or aspects, provided is a method 400 for providing instant credit to a customer at a point-of-sale (POS). The steps of the method 400 may be completed by a transaction processing server, credit analysis server, other transaction service provider system server, or any combination thereof. In step 402, the transaction processing server may receive a transaction approval request, e.g., a transaction authorization request. The transaction approval request may include a full transaction amount for one or more transactions between a merchant and a customer at a POS configured in an electronic payment processing network. In step 406, the transaction processing server may communicate a credit approval request based on the transaction approval request to an issuer system. The credit approval request may be the transaction approval request. The credit approval request may include part or all of the data of the transaction approval request. In step 410, the transaction processing server may or may not receive a credit approval from the issuer system for the full transaction amount of the transaction. If the transaction processing server receives a credit approval message authorizing a credit transaction for the full transaction amount, then the transaction processing server may complete processing of the transaction in step 414.

If the issuer system does not approve the full transaction amount, either through a credit decline or a partial credit approval, the transaction processing server may determine customer data used to evaluate an extension of credit to the customer in step 416. In step 418, the credit analysis server may determine if the customer is able to be granted an extension of credit, e.g., a micro-credit, by the transaction service provider to cover the remainder of the full transaction amount. If the credit analysis server determines that the customer may be granted an extension of credit, the transaction processing server may grant an extension of credit via the transaction service provider in step 422. The extension of credit may be for the full transaction amount, in the case of the transaction processing server alone providing a credit for the transaction. The extension may also be for an amount less than the full transaction amount, but combined with one or more other partial credit approvals (e.g., via an issuer system) the extension may cover the full transaction amount. In step 426, the transaction processing server may communicate a transaction approval message, e.g., a transaction authorization message, to a merchant system associated with the POS (e.g., including to the POS itself), wherein the transaction approval message includes the full transaction amount. It will further be appreciated that the transaction service provider system may determine not to provide an extension of credit to complete credit approval for the full transaction amount, after evaluating the customer data. In such a case, other entities may be communicated customer data for the issuance of an extension of credit. The transaction processing server may also finally decline the credit transaction.

Figure 5:
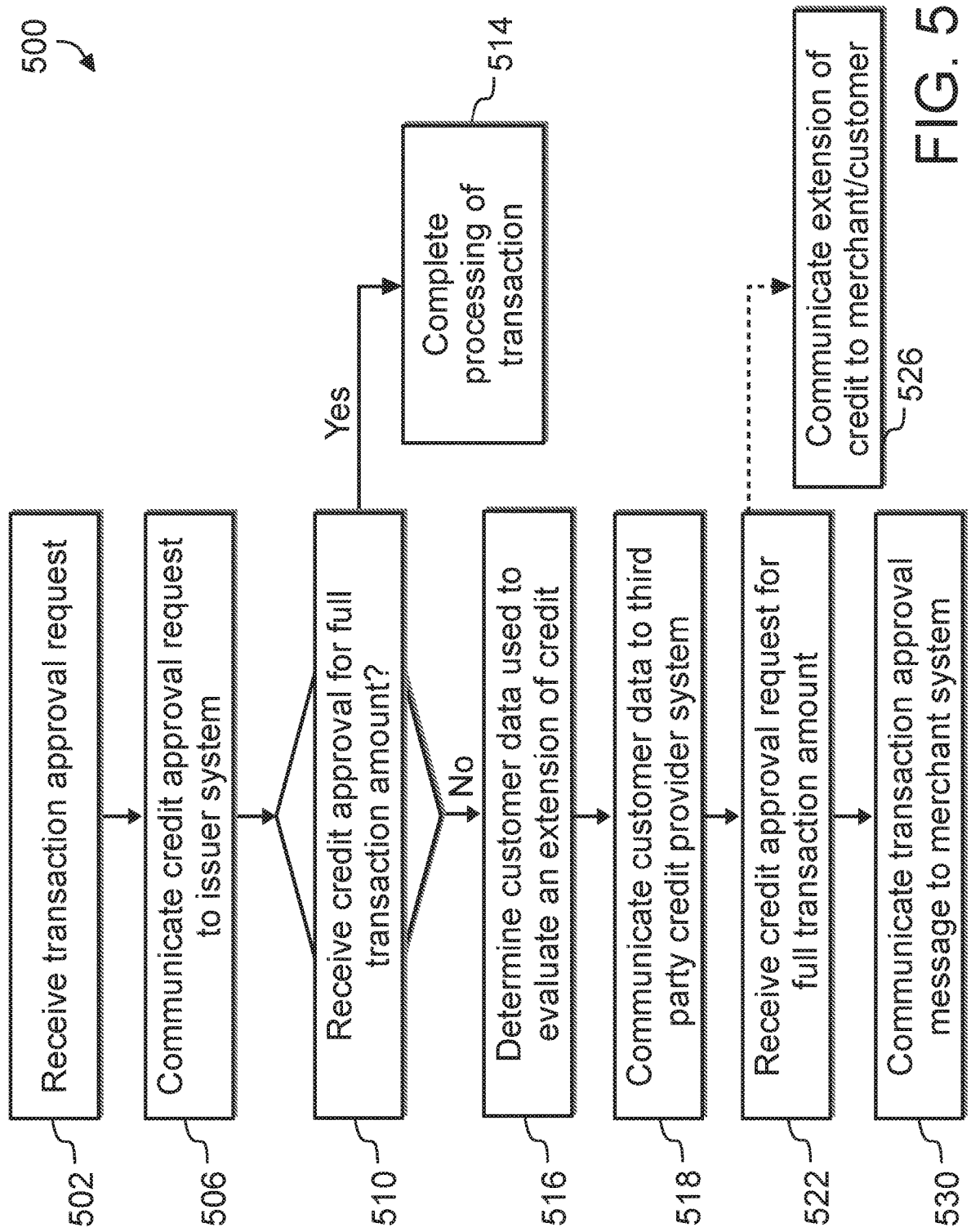
FIG. 5 is a process diagram of one embodiment or aspect of a system for providing instant credit to a customer at a point-of-sale.

With specific reference to FIG. 5, and in non-limiting embodiments or aspects, provided is a method 500 for providing instant credit to a customer at a point-of-sale (POS). The steps of the method 500 may be completed by a transaction processing server, credit analysis server, other transaction service provider system server, or any combination thereof. In step 502, the transaction processing server may receive a transaction approval request, e.g., a transaction authorization request. The transaction approval request may include a full transaction amount for one or more transactions between a merchant and a customer at a POS configured in an electronic payment processing network. In step 506, the transaction processing server may communicate a credit approval request based on the transaction approval request to an issuer system. The credit approval request may be the transaction approval request. The credit approval request may include part or all of the data of the transaction approval request. In step 510, the transaction processing server may or may not receive a credit approval from the issuer system for the full transaction amount of the transaction. If the transaction processing server receives a credit approval message authorizing a credit transaction for the full transaction amount, then the transaction processing server may complete processing of the transaction in step 514.

If the issuer system does not approve the full transaction amount, either through a credit decline or a partial credit approval, the transaction processing server may determine customer data used to evaluate an extension of credit to the customer in step 516. In step 518, the transaction processing server may communicate the customer data to a third party credit provider system, so as to cause the third party credit provider system to evaluate if the customer should be given an extension of credit, e.g., a micro-credit, by the third party credit provider to cover the remainder of the full transaction amount. In step 522, the transaction processing server may receive a credit approval message for the full transaction amount. Credit approval of the full transaction amount may be a single approval from the third party credit provider covering the full transaction amount. Credit approval of the full transaction amount may also be a partial credit approval from the third party credit provider that, when combined with a partial credit approval from the issuer system, covers the full transaction amount. In step 530, the transaction processing server may communicate a transaction approval message, e.g., a transaction authorization message, to a merchant system associated with the POS (e.g., including to the POS itself), wherein the transaction approval message includes the full transaction amount. It will further be appreciated that the third party credit provider may determine not to grant an extension of credit to the customer after evaluating the customer data. In such a case, other entities may be communicated customer data for the issuance of an extension of credit. The transaction processing server may also finally decline the credit transaction.

In step 526, the extension of credit by the third party credit provider may be independently communicated to the merchant and/or customer. For example, the merchant may receive a message at a communication device associated with the merchant alerting that a third party credit provider has covered the remainder of the full transaction amount (e.g., all or part of the full transaction amount). By way of further example, the customer may receive a message on a communication device (e.g., a mobile device) alerting the customer that their transaction has been covered at least partially by an extension of credit by a third party credit provider. It will be appreciated that step 526 may be similarly performed in FIG. 4 for an extension of credit by a transaction service provider, or in FIG. 3 for an extension of credit by an issuer system.

Figure 6:
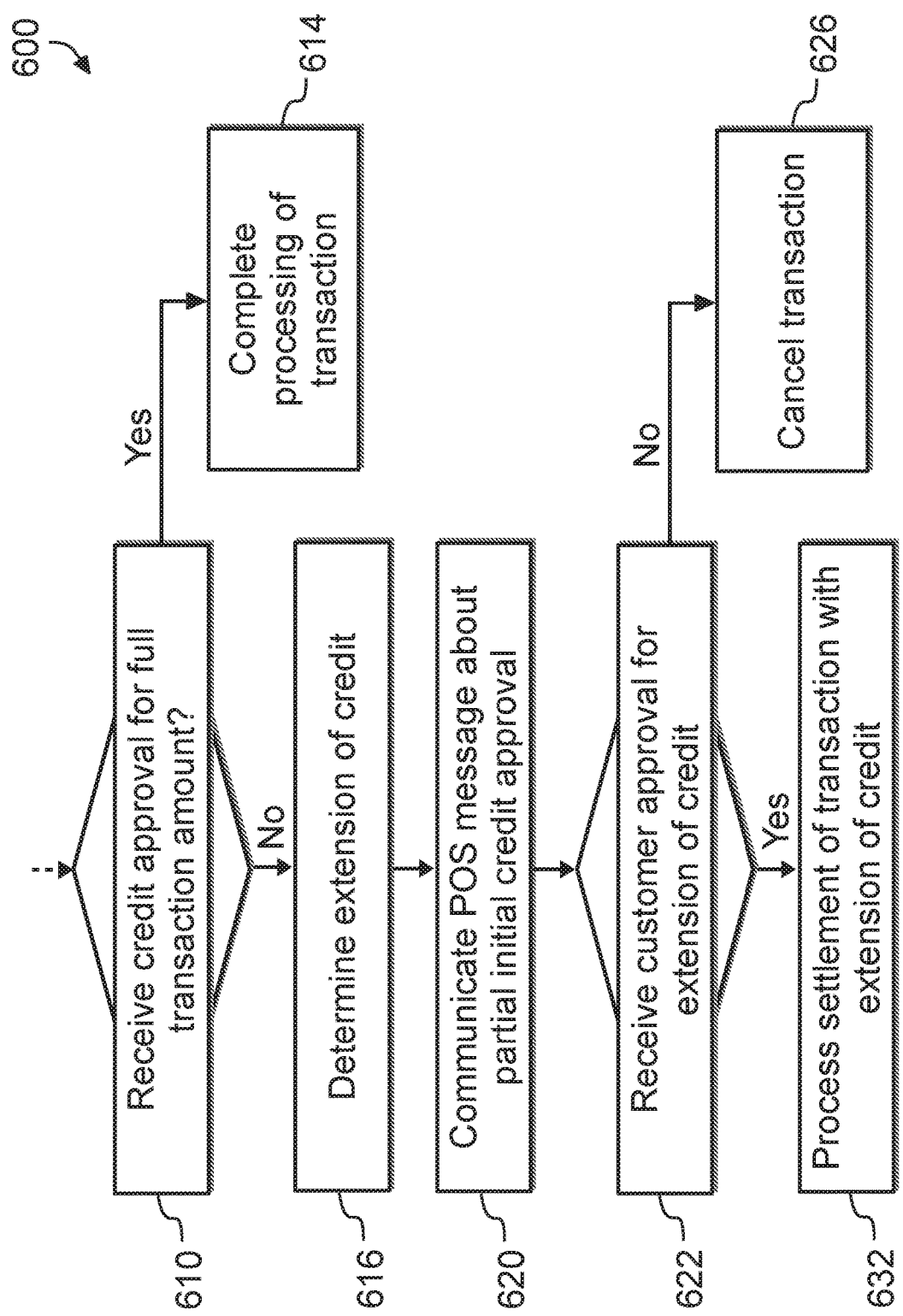
FIG. 6 is a process diagram of one embodiment or aspect of a system for providing instant credit to a customer at a point-of-sale.

With specific reference to FIG. 6, and in non-limiting embodiments or aspects, provided is a method 600 for providing instant credit to a customer at a point-of-sale (POS). The steps of the method 600 may be completed by a transaction processing server, a credit analysis server, another transaction service provider system server, or any combination thereof. The steps of the method 600 may further follow the initiation of a transaction between a customer and a merchant POS and the initial communication of a credit approval request to an issuer system. In step 610, if the transaction processing server receives a credit approval message for the full transaction amount from the issuer system, the transaction processing server may complete the processing of the transaction in step 614. If the transaction processing server does not receive a credit approval message for the full transaction amount in step 610, then the credit analysis server may use customer data to determine an extension of credit that could be offered to the customer. The extension of credit may be proposed to be provided by an issuer, the transaction service provider, a third party credit provider, or any combination thereof. In step 620, the transaction processing server may communicate a POS message about the partial initial credit approval, which may include a request for authorization to proceed with the extension of credit as determined in step 616.

In step 622, the transaction processing server may or may not receive customer approval for an extension of credit. If not, the transaction processing server may cancel the transaction in step 626 and may not proceed with the extension of credit. If approved, the transaction processing server may process the settlement of the transaction with the extension of credit 632, whether the extension of credit is provided by the transaction service provider, issuer, third party credit provider, and/or the like. The extension of credit may be for part or all of the full transaction amount.

It will be appreciated that in some non-limiting embodiments or aspects, steps 620 and 622 may precede step 616, so that a customer may approve or decline an extension of credit before the details of an extension of credit are determined in step 616. It will also be appreciated that the message of step 620 may instead be communicated to a communication device of the customer, so that the customer may communicate approval to the transaction service provider system from a device other than the POS. It will further be appreciated that step 616 may be omitted, such that the extension of credit is determined instead by an issuer system or third party credit provider system in or after step 632, in which case the customer may approve an extension of credit in the general case.

Figure 7:
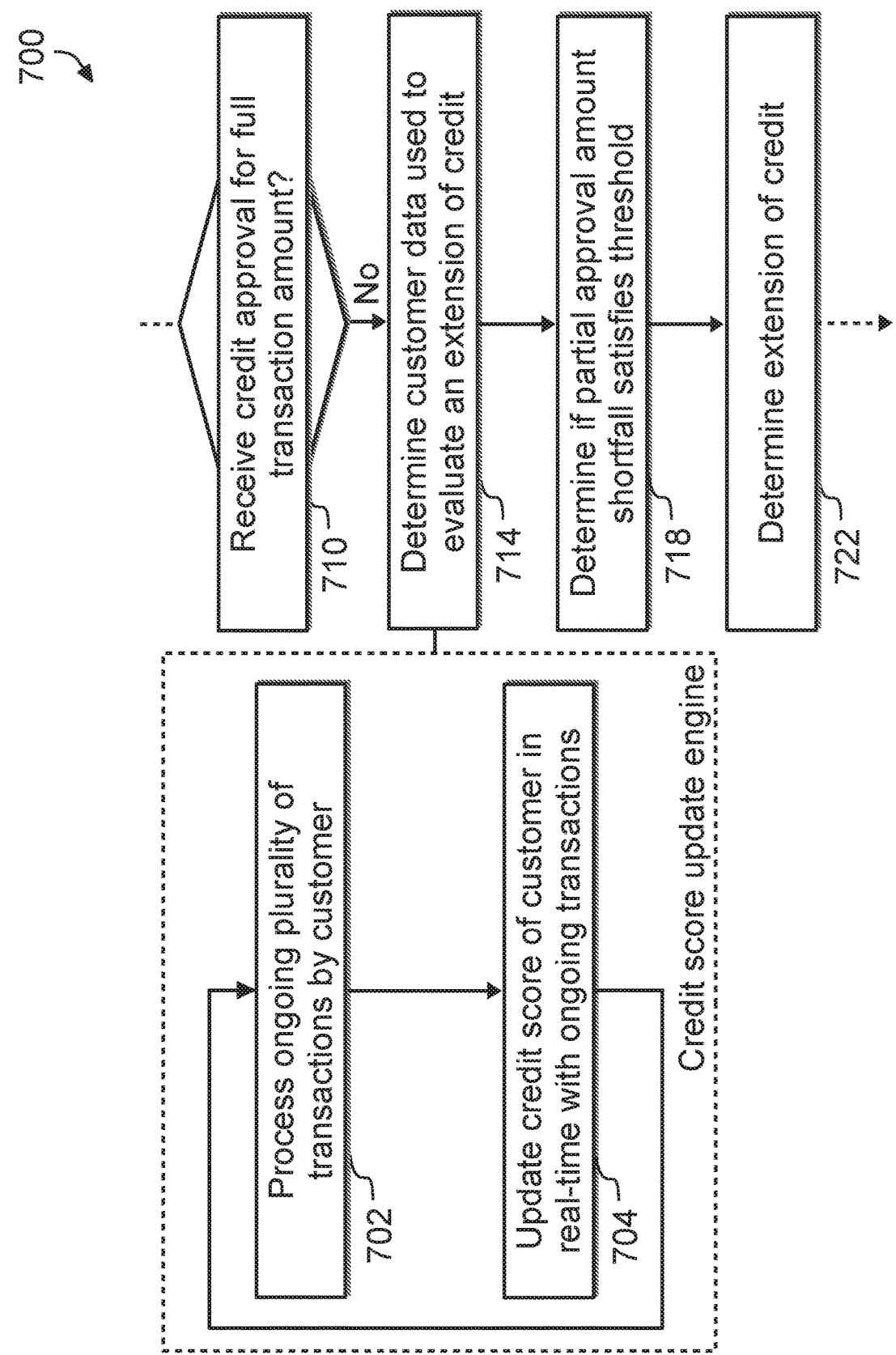
FIG. 7 is a process diagram of one embodiment or aspect of a system for providing instant credit to a customer at a point-of-sale.

With specific reference to FIG. 7, and in non-limiting embodiments or aspects, provided is a method 700 for providing instant credit to a customer at a point-of-sale (POS). The steps of the method 700 may be completed by a transaction processing server, a credit analysis server, another transaction service provider system server, or any combination thereof. Step 710 may follow the initiation of a transaction between a customer and a merchant POS and the initial communication of a credit approval request to an issuer system. Steps 702 and 704 may be ongoing and represent the recurring process of a credit score update engine of a transaction service provider system. In step 702, a transaction processing server may process an ongoing plurality of transactions by one or more customers, including the customer of the subject credit transaction. Historic transaction data may be generated and stored based on the plurality of transactions. In step 704, a credit analysis server may update a stored credit score of the customer in real-time with ongoing transactions by the customer. For example, as the customer of the subject credit transaction takes part in historic transactions, the credit score of the customer may be improved to reflect positive, less-risky behavior (e.g., vis-à-vis credit lending), or the credit score of the customer may be devalued to reflect negative, more-risky behavior (e.g., vis-à-vis credit lending). In this manner, the transaction service provider system is retaining and consistently updating a credit evaluation of the customer in real-time with customer transaction activity.

In step 710, the transaction processing server may or may not receive a credit approval message from the issuer system for the full transaction amount. If the transaction processing server receives a credit approval message for the full transaction amount, then the transaction processing server may proceed with settling the credit transaction. If the transaction processing server does not receive a credit approval message from the issuer system for the full transaction amount (e.g., a credit decline or partial credit approval), a credit analysis server may determine customer data used to evaluate an extension of credit in step 714. The customer data may include the customer score of the customer as regularly updated in steps 702 and 704. In step 718, the credit analysis server may compare the partial approval amount and/or decline of credit to a threshold indicative that an extension of credit should be approved for the customer. Similarly, the shortfall between the decline or partial approval and the full transaction amount may be compared to a threshold. The threshold may be predetermined, such as specific to the customer, a region, an issuer, a third party credit provider, a payment device, and/or the like. The threshold may also be dynamic, relative to a credit score, transaction history, initial transaction amount, and/or the like. If the difference between the full transaction amount and the partial approval amount (or decline) is less than or equal to a threshold for micro-credit approval, then the transaction processing server may determine an extension of credit for the customer in step 722, such as through the issuer, a third party credit provider, the transaction service provider, and/or the like. If the difference between the full transaction amount and the partial approval amount (or decline) is greater than a threshold for micro-credit approval, then the transaction processing server may decline the credit transaction.

In further view of the foregoing, and in some non-limiting embodiments or aspects, to accommodate third party credit providers of micro-credits, the transaction service provider system may facilitate a program for micro-credit issuer certification. The certification may vary as per regional needs and total credit volumes can be defined to be low to reduce risk of default. The transaction service provider system may generate a subscription service to enroll customers and may generate new token vaults to store customer information either owned by the transaction service provider or a third party. To complete credit transactions covered by an issuer and a third party credit provider, the transaction service provider system effectively settles transactions with two issuers: the issuer of the payment device, and the issuer of the micro-credit. For a system including third party credit provider micro-credits, additional components may include a new vault, new micro-credit messages, a new settlement process flow, a new service to get customer details, a new certification process, and a new model to calculate creditworthiness. The new service to get customer details may be an application programming interface (API) to receive customer information from a token vault. The input to the API may be a token, and the output of the API may be customer details required for a credit check and/or billing.

In further view of the foregoing, and in some non-limiting embodiments or aspects, to accommodate issuer providers of micro-credits, the transaction service provider system may facilitate a program for issuer participation. Upon receiving a decline or partial approval of an initial credit transaction, the transaction service provider system may calculate a rating and send a special type of transaction request for a micro-credit. The issuer may approve the special transaction request, and in response, the transaction service provider system may approve the original transaction the merchant, while settling two different transactions with the issuer. For a system including issuer provider micro-credits, additional components may include new micro-credit messages and a new model to calculate creditworthiness.

In further view of the foregoing, and in some non-limiting embodiments or aspects, to accommodate the transaction service provider as a provider of micro-credits, the transaction service provider system's role must be augmented. The transaction service provider may act on behalf of one or more issuers, and the transaction service provider and a specific issuer may predetermine an amount of additional funds that the transaction service provider may use to provide micro-credits on behalf of the specific issuer. In this manner, liability remain with the issuer. The transaction service provider may develop a new decision model that approves or declines a micro-credit request based on an internal rating and the availability of funds. Upon approval, the transaction service provider system may send a new credit transaction to the customer for the differential amount (between full transaction amount and a declined or partially approved amount) and an approval to the merchant for the full transaction amount. The transaction service provider system may also communicate a message to the issuer system advising approval of the full transaction amount, where applicable. For a system including a transaction service provider as a micro-credit provider, additional components may include new micro-credit messages, a new settlement process flow, a new credit recommendation process flow, a new credit authorization process flow, and a new model to calculate creditworthiness.

In further view of the foregoing, and in some non-limiting embodiments or aspects, the transaction service provider system may be augmented to split one clearing message into multiple clearing messages sent to multiple issuers and calculating different fees for the different issuers. This may be done by the transaction service provider system storing the original authorization message and referencing it to the multiple responses it receives from issuers. For example, the transaction processing server may receive a request from an acquirer processor to complete a credit transaction for 100 USD. This transaction authorization request may be assigned a transaction request ID (e.g., "ARequest 1"). As the transaction processing server receives credit approvals, each less than the full transaction amount but combining to satisfy the full transaction amount, it may store the responses in a data table with response IDs (e.g., "AResponse 1", "AResponse 2"). The response IDs may be each associated with the transaction request ID. The below table illustrates one such data storage relationship:

TABLE 1

| Transaction Authorization Request ID | Response ID | Issuer | Amount |
| --- | --- | --- | --- |
| ARequest 1 | AResponse 1 | Issuer A | 50 USD |
| ARequest 1 | AResponse 2 | Issuer B | 50 USD |

A clearing request may be received from the acquirer process for the transaction authorization request ("ARequest 1") for 100 USD. The transaction service provider system may identify response IDs associated with the transaction request ID, and may generate clearing records for the response IDs.

Although the disclosure has been described in detail for the purpose of illustration based on what is currently considered to be the most practical and non-limiting embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for providing instant credit to a customer at a point-of-sale, the method comprising:

receiving, with at least one processor, a transaction approval request comprising a full transaction amount for at least one transaction between a merchant and the customer at the point-of-sale configured in an electronic payment processing network;

communicating, with at least one processor, a credit approval request based on the transaction approval request to an issuer system;

in response to the issuer system initially declining the credit approval request or approving less than the full transaction amount, and in response to receiving a data request message from the issuer system, determining, with at least one processor, customer data used to evaluate an extension of credit to the customer;

communicating, with at least one processor, the customer data to the issuer system;

receiving, with at least one processor, a credit approval message from the issuer system comprising the full transaction amount; and communicating, with at least one processor, a transaction approval message to a merchant system associated with the point-of-sale, wherein the transaction approval message comprises the full transaction amount.

2. The method of claim 1, wherein the customer data is determined at least partially from historic transaction data of a plurality of transactions by the customer in a preceding time period.

3. The method of claim 1, further comprising:
communicating, with at least one processor, a message to the merchant system configured to cause the point-of-sale to display a notification of partial initial credit approval; and
processing, with at least one processor, settlement of the at least one transaction in response to input authorization at the point-of-sale by the customer for the extension of credit.

4. The method of claim 1, further comprising communicating, with at least one processor, a message to the merchant system configured to cause the point-of-sale to display a notification of the extension of credit to the customer.

5. The method of claim 1, further comprising communicating, with at least one processor, a message to a mobile device of the customer notifying of the extension of credit to the customer.

6. The method of claim 1, further comprising:
processing, with at least one processor, an ongoing plurality of transactions by the customer with at least one merchant in the electronic payment processing network; and
updating, with at least one processor, a credit score of the customer based on, and in real-time with, at least one of the ongoing plurality of transactions;
wherein the customer data comprises the credit score.

7. The method of claim 1, wherein the determining of the customer data is further in response to determining that a difference between the full transaction amount and a partial approval amount of the issuer system satisfies a threshold predetermined range for the extension of credit.

8. A system for providing instant credit to a customer at a point-of-sale, the system comprising at least one server computer including at least one processor, the at least one server computer programmed and/or configured to:
receive a transaction approval request comprising a full transaction amount for at least one transaction between a merchant and the customer at the point-of-sale configured in an electronic payment processing network;
communicate a credit approval request based on the transaction approval request to an issuer system;
in response to the issuer system initially declining the credit approval request or approving less than the full transaction amount, and in response to receiving a data request message from the issuer system, determine customer data used to evaluate an extension of credit to the customer;
communicate the customer data to the issuer system;
receive a credit approval message from the issuer system comprising the full transaction amount; and
communicate a transaction approval message to a merchant system associated with the point-of-sale, wherein the transaction approval message comprises the full transaction amount.

9. The system of claim 8, wherein the customer data is determined at least partially from historic transaction data of a plurality of transactions by the customer in a preceding time period.

10. The system of claim 8, wherein the at least one server computer is further programmed and/or configured to:
communicate a message to the merchant system configured to cause the point-of-sale to display a notification of partial initial credit approval; and
process settlement of the at least one transaction in response to input authorization at the point-of-sale by the customer for the extension of credit.

11. The system of claim 8, wherein the at least one server computer is further programmed and/or configured to communicate a message to the merchant system configured to cause the point-of-sale to display a notification of the extension of credit to the customer.

12. The system of claim 8, wherein the at least one server computer is further programmed and/or configured to communicate a message to a mobile device of the customer notifying of the extension of credit to the customer.

13. The system of claim 8, wherein the at least one server computer is further programmed and/or configured to:
process an ongoing plurality of transactions by the customer with at least one merchant in the electronic payment processing network; and
update a credit score of the customer based on, and in real-time with, at least one of the ongoing plurality of transactions;
wherein the customer data comprises the credit score.

14. The system of claim 8, wherein determining the customer data is further in response to determining that a difference between the full transaction amount and a partial approval amount of the issuer system satisfies a threshold predetermined range for the extension of credit.

15. A computer program product for providing instant credit to a customer at a point-of-sale, the computer program product comprising at least one non-transitory computer-readable medium including program instructions that, when executed by at least one processor, cause the at least one processor to:
receive a transaction approval request comprising a full transaction amount for at least one transaction between a merchant and the customer at the point-of-sale configured in an electronic payment processing network;
communicate a credit approval request based on the transaction approval request to an issuer system;
in response to the issuer system initially declining the credit approval request or approving less than the full transaction amount, and in response to receiving a data request message from the issuer system, determine customer data used to evaluate an extension of credit to the customer;
communicate the customer data to the issuer system;
receive a credit approval message from the issuer system comprising the full transaction amount; and
communicate a transaction approval message to a merchant system associated with the point-of-sale, wherein the transaction approval message comprises the full transaction amount.

16. The computer program product of claim 15, wherein the customer data is determined at least partially from historic transaction data of a plurality of transactions by the customer in a preceding time period.

17. The computer program product of claim 15, wherein the program instructions further cause the at least one processor to:
communicate a message to the merchant system configured to cause the point-of-sale to display a notification of partial initial credit approval; and
process settlement of the at least one transaction in response to input authorization at the point-of-sale by the customer for the extension of credit.

18. The computer program product of claim 15, wherein the program instructions may further cause the at least one processor to communicate a message to: (i) the merchant system configured to cause the point-of-sale to display a notification of the extension of credit to the customer; (ii) a mobile device of the customer notifying of the extension of credit to the customer; or any combination thereof.

19. The computer program product of claim 15, wherein the program instructions further cause the at least one processor to:
- process an ongoing plurality of transactions by the customer with at least one merchant in the electronic payment processing network; and
- update a credit score of the customer based on, and in real-time with, at least one of the ongoing plurality of transactions;
- wherein the customer data comprises the credit score.

20. The computer program product of claim 15, wherein determining the customer data is further in response to determining that a difference between the full transaction amount and a partial approval amount of the issuer system satisfies a threshold predetermined range for the extension of credit.

* * * * *